April 7, 1970  P. J. CADE  3,504,993
COMBUSTION CONTROL CIRCUIT
Filed March 18, 1968  2 Sheets-Sheet 1

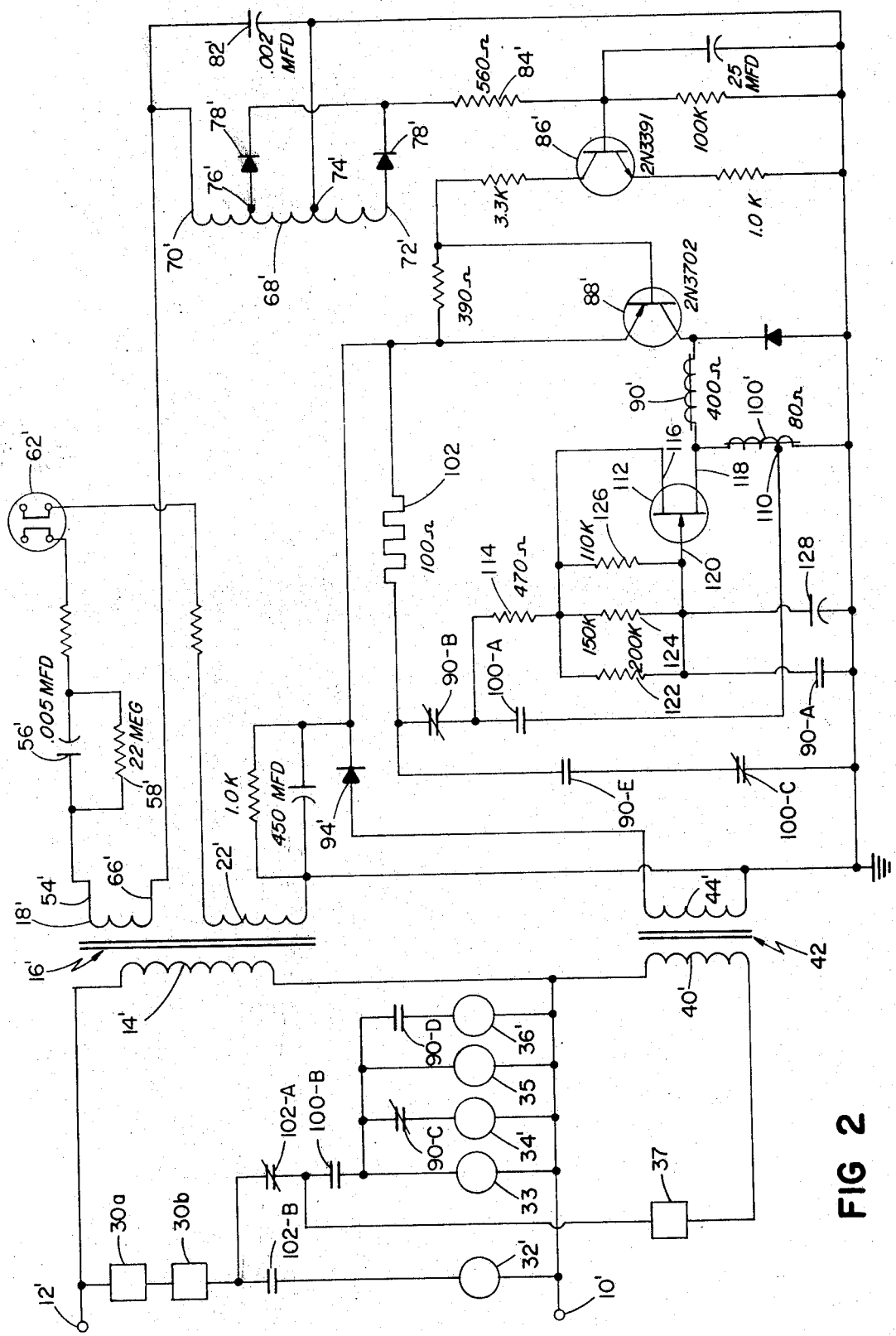

United States Patent Office 3,504,993
Patented Apr. 7, 1970

3,504,993
COMBUSTION CONTROL CIRCUIT
Phillip J. Cade, Winchester, Mass., assignor to Electronics
 Corporation of America, Cambridge, Mass., a corporation of Massachusetts
Filed Mar. 18, 1968, Ser. No. 713,755
Int. Cl. F23n 5/24
U.S. Cl. 431—26        2 Claims

ABSTRACT OF THE DISCLOSURE

A combustion control system includes a main control relay; an ultraviolet radiation sensor tube and electronic circuitry connected to the sensor for operating a flame relay; fuel and ignition control elements; and an operating control. Two transformers are connected to the energizing terminals of the system, a first transformer that has its primary winding connected directly to those terminals and a second transformer that has its primary winding connected to those terminals through the operating control. The first transformer has two 280 volt secondary windings across which are connected the ultraviolet radiation sensor tube and a readout inductor that couples an avalanche breakdown signal from that tube to the flame relay circuitry. The second transformer has an 18 volt secondary winding across which is connected the main control relay.

SUMMARY OF INVENTION

Figure 1:
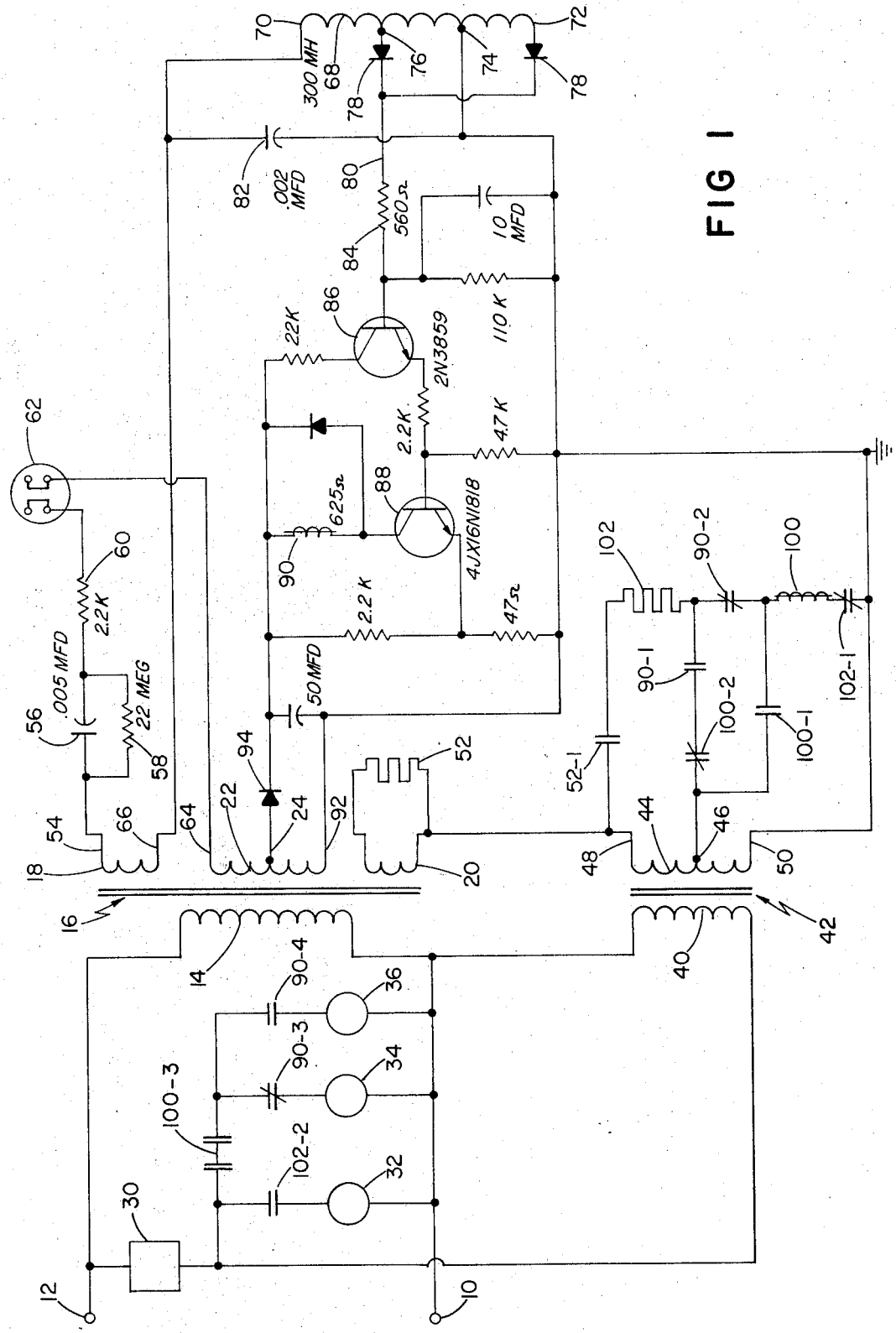

This invention relates to electrical control circuitry and more particularly to control circuitry particularly adapted for use in combustion supervision systems that employ flame detectors of the avalanche discharge type.

In the operation of combustion supervision systems, prompt detection of a flame failure is essential and the proper operation of the entire system should be continually checked. Many combustion supervision systems employ detectors of the avalanche discharge type that are responsive to ultraviolet radiation. While most sensors of that type have extremely long life, some such sensors may gradually deteriorate so that they remain in a discharging condition after an avalanche discharge has been initiated by the sensing of ultraviolet radiation, even though the source of ultraviolet radiation no longer exists. A continuously avalanching tube of that type would not detect a loss of flame and shut the burner controls of the supervised combustion system off promptly. Failure to shut the combustion system down promptly under such conditions might result in an extremely hazardous condition.

Accordingly, it is an object of this invention to provide an improved combustion control system that more reliably detects defective flame sensors of the avalanche discharge type, thus increasing the reliability that the system will be shut down in safe condition promptly on detection of flame failure.

Another object of the invention is to provide a novel and improved combustion control system that utilizes an ultraviolet radiation responsive flame sensor of the avalanche discharge type.

In accordance with the invention, there is provided burner control apparatus for use with a fuel burner installation that has a combustion chamber, an operating control, a fuel control for controlling the flow of fuel to the combustion chamber, and an ignition control for igniting fuel in the combustion chamber. The apparatus includes a flame sensor of the avalanche discharge type for sensing the presence of flame in the combustion chamber and operating a flame relay in response to avalanche breakdown that occurs upon the sensing of flame, and control circuitry including a control relay that is responsive to an operating control and in turn operates the fuel control and ignition control in response to a request for burner operation. Two energizing sources are employed, a first source connected directly to the flame sensor so that the flame sensor is continuously energized. The second source is connected in series with the operating control so that the second source is energized only in response to a request for burner operation for energizing the control relay in response to the request for burner operation and terminating the energization of the control relay when the request for burner operation has been satisfied.

In particular embodiments, the two energizing sources are transformers, each of which includes a primary winding and a secondary winding. The flame sensor is energized at a relatively high voltage through a stepup transformer while the control circuitry is energized with a relatively low voltage through a stepdown transformer, only the low voltage signal being interrupted by the operating control. The preferred embodiments of the invention also feature the use of a time delay for delaying energization of the control relay a predetermined interval after the operating control signals a request for burner operation, thus providing a check on the proper operating characteristics of the flame sensor and the circuitry which responds to it. The circuitry by maintaining the flame sensor continuously energized permits prompt detection by suitable self-checking techniques of a defective sensor tube and also eliminates the opportunity for the sensor tube to temporarily recover from a "soft" condition upon de-energization at the termination of a request for burner operation.

Other objects, features and advantages of the invention will be seen as the following description of particular embodiments of the invention progresses, in conjunction with the drawings in which:

FIG. 1 is a schematic diagram of a combustion control system constructed in accordance with the invention; and FIG. 2 is a schematic diagram of another form of combustion control system constructed in accordance with the invention.

DESCRIPTION OF PARTICULAR EMBODIMENTS

With reference to FIG. 1 terminals 10, 12 are adapted to be connected to a suitable source of power. Connected directly across terminals 10, 12 is primary winding 14 of transformer 16 that has a 280 volt secondary winding 18, a 0.2 volt secondary winding 20, and a second 280 volt secondary winding 22 that has a center tap 24 at 18 volts. Also connected across terminals 10 and 12 is an operating control section that may include such operating controls as limit switches and a thermostat, an alarm device 32, an ignition device 34, and a fuel control device 36. Connected across terminals 10 and 12, in series with operating controls 30 is the primary winding 40 of a second transformer 42. The secondary winding 44 of transformer 42 is an 18 volt winding that has a 12 volt center tap 46 and terminals 48 and 50.

0.2 volt secondary winding 20 has a start control heater 52 connected across it. Connected to the high voltage terminal 54 of winding 18 is capacitor 56 in parallel with resistor 58; resistor 60; and ultraviolet flame sensor 62 of the avalanche discharge type. The tube 62 is connected to the low voltage terminal 64 of winding 22.

Connected to the low voltage terminal 66 of winding 18 is inductor 68 that has two terminals 70, 72 and two taps 74, 76. Terminal 72 and tap 76 are each coupled via diodes 78 to common output bus 80. Capacitor 82 is connected between terminal 70 and tap 74, and tap 74 is connected to ground.

The output bus 80 is connected via resistor 84 to an amplifier circuit that includes transistors 86 and 88. Transistor 88 has coil 90 of a flame relay connected in its collector circuit. That flame relay controls normally open contacts 90–1 and 90–4 and normally closed contacts 90–2 and 90–3. This transistor amplifier circuit is energized by an 18 volt potential applied between tap 24 and reference terminal 92 of transformer secondary 22 via diode 94.

The main control circuitry connected to the transformer 42 includes a main control relay 100 which controls normally open contacts 100–1 and 100–3 and normally closed contacts 100–2. The control relay coil 100 is connected across the secondary winding 44 of transformer 42 in a series circuit that includes normally open contacts 52–1 which are controlled by heater 52, the lockout switch actuator 102, normally closed flame relay contacts 90–3, and normally closed contacts 102–1 of the lockout switch.

When power is applied to terminals 10, 12, the secondary windings 18, 20 and 22 of transformer 16 are directly energized. The flame detector 62 is immediately energized, that component being connected between terminal 54 of secondary winding 18 and terminal 64 of secondary winding 22; and the flame relay amplifier is similarly immediately energized as it is connected between terminal 92 and tap 24 of secondary winding 22. Also, safe start contacts 52–1 close after an initial delay (a typical value being in the range of 3–10 seconds), providing a delay between energization of the flame relay electronics and detector 62 prior to the enabling of the main control relay 100 to provide a check on the proper operability of that flame detection circuitry. Should the flame supervision circuitry not be properly operative, for example, due to a defective (e.g. continuously avalanching) sensor tube 62, the coil 90 of the flame relay will be energized and open flame relay contacts 90–2, thus preventing energization of control relay 100 in response to a request from control 30.

Transformer 42 is energized only in response to a request for burner operation and upon such request, provided the flame detection circuitry is in proper operating condition and the initial delay imposed by heater 52 has occurred, the control relay 100 will be energized. Upon energization of coil 100, contacts 100–1 close, establishing a holding circuit for relay coil 100 from tap 46 of secondary winding 44. This holding circuit is independent of the lockout actuator element 102 of the safety lockout device. Heater 102 remains energized, however, as it is connected across a voltage source between terminal 48 and tap 46 in a circuit that includes the now closed start contacts 52–1, flame relay contacts 90–2, and control relay contacts 100–1. This circuit maintains the lockout switch heater 102 energized until detection of flame opens flame relay contacts 90–2 or the system is shut down in lockout condition.

With the energization of control relay 100, contacts 100–3 are also closed energizing the ignition element 34 through flame relay contacts 90–3. As soon as ignition occurs and flame is detected in the combustion chamber by sensor 62, a signal is produced by that sensor to energize coil 90 of the flame relay. Contacts 90–1 and 90–4 close while contacts 90–2 and 90–3 open. The opening of contacts 90–3 de-energize the ignition control device 34 while the closing of contacts 90–4 energize the main fuel control unit 36 so that fuel from the main fuel line flows into the combustion chamber to establish the main flame which is continually supervised by sensor 62. The opening of contacts 90–2 terminates the heating of lockout switch actuator 102 and the apparatus is now in operative condition with flame relay 90 and control relay 100 in energized condition and the operating control 30 continuing to request operation of the burner.

As soon as the operating control 30 terminates the request for operation of the burner, its circuit will open and de-energize the main fuel control 36 and transformer 42, thus deenergizing the main control relay. With the termination of flow of fuel into the combustion chamber, flame will cease and the flame relay 90 will be de-energized so that the control sections of the apparatus are shut down in anticipation of the next operating cycle but the flame detector 62 remains energized.

Should the flame sensor 62 indicate flame when the control relay 100 was not energized, the flame relay 90 will be energized and open contacts 90–2, preventing energization of control relay coil 100. At the same time, contacts 90–1 will close in a cycle heating the lockout switch actuator 102 to open lockout contacts 102–1 and to close lockout contacts 102–2, the latter energize alarm 32 (after a delay typically in the order of 6–9 seconds). Similarly, should the flame sensor 62 not detect flame in the combustion chamber within the timing interval of the lockout switch actuator 102, that heater will operate contacts 102–1 and 102–2 to shut the system down in safe condition and actuate the alarm 32.

A second circuit is shown in FIG. 2. In this circuit components similar to the components in FIG. 1 will be designated with the same reference numeral plus a prime. Control power supplied to the circuit at terminals 10', 12'. Connected in series with terminal 12' is a limit switch 30a and an operating control 30b such as a thermostat. The system further includes an alarm 32' connected through lockout switch contacts 102–B; a blower motor 33 connected through normally closed lockout switch contacts 102–A; a pilot fuel control 35 controlled by the normally open main control relay contacts 100–B and lockout switch contacts 102–A; and spark ignition circuit 34' and main fuel control 36' controlled respectively by flame relay contacts 90–C and 90–D in addition to the main control relay contacts 100–B and lockout contacts 102–A.

A main transformer 16' has a primary winding 14' connected directly across terminals 10', 12'. That transformer has two secondary windings, 18' and 22'. In addition, a second transformer 42' has its primary winding 40' connected in series with air flow switch 37, the lockout switch contacts 102–A, and the operating and limit switches 30a, 30b across terminals 10', 12'. The secondary winding 44' of transformer 42' is connected via diode 94' to energize both the flame relay electronic amplifier circuitry and the circuitry that energizes the control relay 100'.

As described above in connection with FIG. 1, secondary winding 18' of transformer 16' energizes sensor 62' via capacitor 56' and resistor 58'. The second terminal 66' of secondary winding 18' is connected to inductor 68' that has terminal 72' and tap 76' connected through diodes 78' to the common input line to the electronic amplifier circuitry (resistor 84'). Terminal 70' is connected via capacitor 82' to tap 74' and to the ground line. The amplifier includes transistors 86' and 88'; transistor 88' having coil 90' of a flame relay connected in its collector circuit. One terminal of flame relay coil 90' is connected to control relay coil 100'.

Connected across the supply to the electronic flame amplifier circuitry is control circuitry that includes lockout heater 102' in series circuit with normally closed flame relay contact 90–B, control relay contacts 100–A and tap 110 of the control relay coil 100'. A time delay circuit including unijunction transistor 112 is also connected in this circuit. Resistor 114 applies a biasing potential to the electrode 116 of unijunction 112 while the second electrode 118 is connected to the terminal of control relay coil 100'. The control electrode 120 of the transistor is connected to an RC timing network that includes resistors 122, 124, and 126 and capacitor 128. Also connected to the heater 102' is the safety check circuit that includes flame relay contacts 90–E and control relay contacts 100–C.

In operation, terminals 10' and 12' normally are energized. The flame detector 62' is continuously energized via transformer 16' so that a potentially failing tube is detected promptly by its failure to cease avalanching when the call for heat has terminated. The main control circuit and flame relay electronics, however, are not energized as they are energized via transformer 42', the primary of which is controlled by the operating controls 30b in the high voltage line. In response to a call for heat as signalled by control 30b, blower 33 is energized through normally closed lockout switch contacts 102–A. As soon as air flow is produced by blower 33, switch 37 closes and energizes the primary winding 40' of transformer 42'. The scanner electronics are energized from secondary winding 44 of the transformer and if proper conditions (no flame) exist and the circuit is operating properly, flame relay 90' remains de-energized. In this event a circuit is completed from the secondary winding 44' of the transformer through the lockout heater 102', flame relay contacts 90–B, to apply a DC signal to the RC network at the terminal connected to the emitter of transistor 112 and at the same time to bias electrode 116. This bias produces a voltage drop between electrodes 116 and 118 and establishes a bias potential on emitter 120. The timing network of resistors 122, 124 and 126 and capacitor 128 is energized and capacitor 128 commences to charge. When the potential on capacitor 128 exceeds the bias potential, the transistor conducts, discharging capacitor 128 through electrode 118 and relay coil 100' in approximately ten milliseconds. With the energization of relay coil 100', its holding contact 100–A is closed completing a holding circuit via tap 110. This holding circuit also completes a low impedance circuit for the lockout heater 102' so that its starts a heating cycle. Contacts 100–B also close, energizing spark ignition circuitry 34' and the pilot fuel control 35. The resulting fuel flow is ignited and when the scanner 62' senses the pilot flame, relay coil 90' is energized in response to the signal from the scanner coupled by inductor 68' and its contacts 90–A close (discharging capacitor 128 in a resetting operation); contacts 90–B open (terminating the heating of the lockout heater 102'); contacts 90–C open (terminating ignition); and contacts 90–D close (permitting fuel to flow to the main burner unit).

Should flame not be established within a predetermined interval as determined by the characteristics of lockout heater 102', that heater will open contact 102–A, de-energizing the main combustion control components 33, 34', 35, 36' and the control transformer 42' (shutting down the system in safe condition); and close contacts 102–B (energizing alarm 32').

If flame is established and after the demand for heat has been satisfied, operating control 30b operates in similar manner to de-energize the main combsution control components 33, 34', 35 and 36' and to de-energize the control transformer 42' but the alarm 32' is not energized. It will be noted that in either event the ultraviolet flame sensor of the avalanche discharge type remains energized so that it is not subject to cycling in response to each request for heat. The timing circuit initiates the cycle for energizing the main control relay only after air flow is established and delays that energization for an accurate interval determined by the electronic timing circuitry, which timing circuitry is rendered inoperative and reset upon initiation of detection of flame in the combustion chamber. Further, the circuitry is coordinated with a lockout circuit to provide a safe shutdown of the combustion system in the event that flame is not detected within a predetermined interval after the main control relay is energized.

While particular embodiments of the invention have been shown and described, various modifications thereof will be apparent to those skilled in the art. Therefore it is not intended that the invention be limited to the disclosed embodiments or to details thereof and departures may be made therefrom within the spirit and scope of the invention as defined in the claims.

What is claimed is:

1. Burner control apparatus for use with a fuel burner installation having a combustion chamber, an operating control, a fuel control for controlling the flow of fuel to the combustion chamber and an ignition control for igniting fuel in the combustion chamber, comprising
   a flame sensor for sensing the presence of flame in the combustion chamber,
   control circuitry including a control relay having a normally open control switch and a time delay circuit for delaying energization of said control relay a predetermined time after said operating control signals a request for burner operation, said time delay circuit including a unijunction transistor connected to said control relay, a bias network and a timing network for overcoming the bias provided by said bias network and allowing said transistor to conduct and energize said control relay after said predetermined time interval,
   a first transformer having a primary winding and a secondary winding, the primary winding of said first transformer being connected directly to a set of energizing terminals and the secondary winding of said first transformer being connected directly to said flame sensor so that said sensor is continuously energized,
   and a second transformer having a primary winding and a secondary winding for energizing said control circuitry,
   the primary winding of said second transformer being connected in series with the operating control for said control circuitry for energization in response for a request for burner operation signaled by said operating control and de-energization when said request for burner operation terminates.

2. Burner control apparatus for use with a fuel burner installation having a combustion chamber, an operating control, a fuel control for controlling the flow of fuel to the combustion chamber and an ignition control for igniting fuel in the combustion chamber, comprising
   a flame sensor for sensing the presence of flame in the combustion chamber,
   control circuitry including a control relay having a normally open control switch,
   a first transformer having a primary winding and two secondary windings connected in series, the primary winding of said first transformer being connected directly to a set of energizing terminals and the secondary windings of said first transformer being step-up windings connected in series directly to said flame sensor for applying a relatively high voltage to said flame sensor so that said sensor is continuously energized,
   a second transformer including a primary winding and a secondary step-down winding, the primary winding of said second transformer being connected to said set of energizing terminals in series with said operating controls and the secondary winding of said second transformer being connected to apply a relatively low voltage to said control circuitry so that said control circuitry is energized only in response to a request for burner operation signalled by said operating control and is de-energized when said request for burner operation terminates, a flame relay, amplifier circuitry for energizing said flame relay, and an inductor connected across said two transformer secondary windings of said first transformer for coupling a signal from said flame sensor to said amplifier circuitry for energizing said flame relay.

References Cited

UNITED STATES PATENTS

| | | | |
|---|---|---|---|
| 2,715,939 | 8/1955 | Smith | 431—69 |
| 2,955,650 | 10/1960 | Deziel | 431—26 |
| 3,082,814 | 3/1963 | Pinckaers | 431—26 |
| 3,113,610 | 12/1963 | Sawyer et al. | 431—24 |
| 3,205,359 | 9/1965 | Giuffrida | 431—79 XR |
| 3,433,572 | 3/1969 | Giuffrida | 431—69 XR |

FREDERICK L. MATTESON, Jr., Primary Examiner

R. A. DUA, Assistant Examiner

U.S. Cl. X.R.

307—29, 38; 431—69